US011424847B2

(12) United States Patent
Iovanna et al.

(10) Patent No.: US 11,424,847 B2
(45) Date of Patent: Aug. 23, 2022

(54) TIME AND WAVELENGTH DIVISION MULTIPLEXING

(71) Applicant: Telefonaktiebolaget LM Ericsson (PUBL), Stockholm (SE)

(72) Inventors: Paola Iovanna, Pisa (IT); Fabio Cavaliere, Pisa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/271,756

(22) PCT Filed: Aug. 31, 2018

(86) PCT No.: PCT/EP2018/073533
§ 371 (c)(1),
(2) Date: Feb. 26, 2021

(87) PCT Pub. No.: WO2020/043318
PCT Pub. Date: Mar. 5, 2020

(65) Prior Publication Data
US 2021/0328703 A1  Oct. 21, 2021

(51) Int. Cl.
*H04J 14/00* (2006.01)
*H04J 14/02* (2006.01)
*H04J 14/08* (2006.01)

(52) U.S. Cl.
CPC ........ *H04J 14/0234* (2013.01); *H04J 14/025* (2013.01); *H04J 14/0246* (2013.01); *H04J 14/0252* (2013.01); *H04J 14/08* (2013.01)

(58) Field of Classification Search
CPC ...... H04J 14/0234; H04J 14/025; H04J 14/02; H04J 14/0252; H04J 14/0246;
(Continued)

(56) References Cited

U.S. PATENT DOCUMENTS

2008/0267630 A1* 10/2008 Qian .................. H04J 14/0298
398/89
2013/0089336 A1   4/2013 Dahlfort et al.
(Continued)

OTHER PUBLICATIONS

PCT Notification of Transmittal of the International Search Report and the Written Opinion of the International Searching Authority, or the Declaration issued for International application No. PCT/EP2018/073533—dated May 24, 2019.
(Continued)

*Primary Examiner* — Hanh Phan
(74) *Attorney, Agent, or Firm* — Baker Botts, LLP (57) ABSTRACT

A method for scheduling resources for a Wavelength Division Multiplexed, WDM, Passive Optical Network, PON. The WDM PON comprises a central hub (201) and a plurality of remote Optical Network Terminals, ONTs, (220) handling different types of communications traffic. The method (450) comprises receiving (452) a notification message from the plurality of remote Optical Network Terminals, ONTs, indicating a loading status of the ONT, and allocating (454) one or more slots to a plurality of the ONTs based on the received notification messages from the ONTs, wherein the plurality of ONTs (220) handle different types of communications traffic. The slots (301) are allocated based on the received notification messages as a time slot which is time division multiplexed with further time slots, and the slots are further allocated based on the received notification messages as an optical wavelength of a plurality of optical wavelengths of the WDM PON.

15 Claims, 5 Drawing Sheets

(58) Field of Classification Search
CPC .. H04J 14/0226; H04J 14/0232; H04B 10/27; H04B 10/40; H04Q 11/0062; H04Q 11/0066; H04Q 11/0067; H04Q 11/0005
USPC ........ 398/66, 67, 68, 69, 70, 71, 72, 74, 75, 398/76, 98, 99, 100, 79, 158, 159, 135, 398/136, 33, 25; 370/352, 392, 489, 468, 370/465, 389
See application file for complete search history.

(56) References Cited

U.S. PATENT DOCUMENTS

| | | | |
|---|---|---|---|
| 2018/0199119 A1* | 7/2018 | Gao | H04Q 11/0071 |
| 2019/0379952 A1* | 12/2019 | Lannone | H04B 10/691 |
| 2020/0052807 A1* | 2/2020 | Sone | H04J 14/0257 |

OTHER PUBLICATIONS

Next Generation Hybrid Wireless-Optical Access With TWDM-PON by Yuanqiu Luo et al.—IEEE 2014.
SD-Enabled Mobile Fronthaul Dynamic Bandwidth and Wavelength Allocation (DBWA) Mechanism in Converged TWDM-EPON Architecture by Andrew Tanny Liem et al.; The 6th International Conference on Cyber and IT Service Management (CITSM 2018)—Aug. 7-9, 2018.

* cited by examiner

TIME AND WAVELENGTH DIVISION MULTIPLEXING

PRIORITY

This nonprovisional application is a U.S. National Stage Filing under 35 U.S.C. § 371 of International Patent Application Serial No. PCT/EP2018/073533 filed Aug. 31, 2018 and entitled "TIME AND WAVELENGTH DIVISION MULTIPLEXING" which is hereby incorporated by reference in its entirety.

TECHNICAL FIELD

The present disclosure relates to a method and apparatus for time and wavelength division multiplexing.

BACKGROUND

Figure 1:
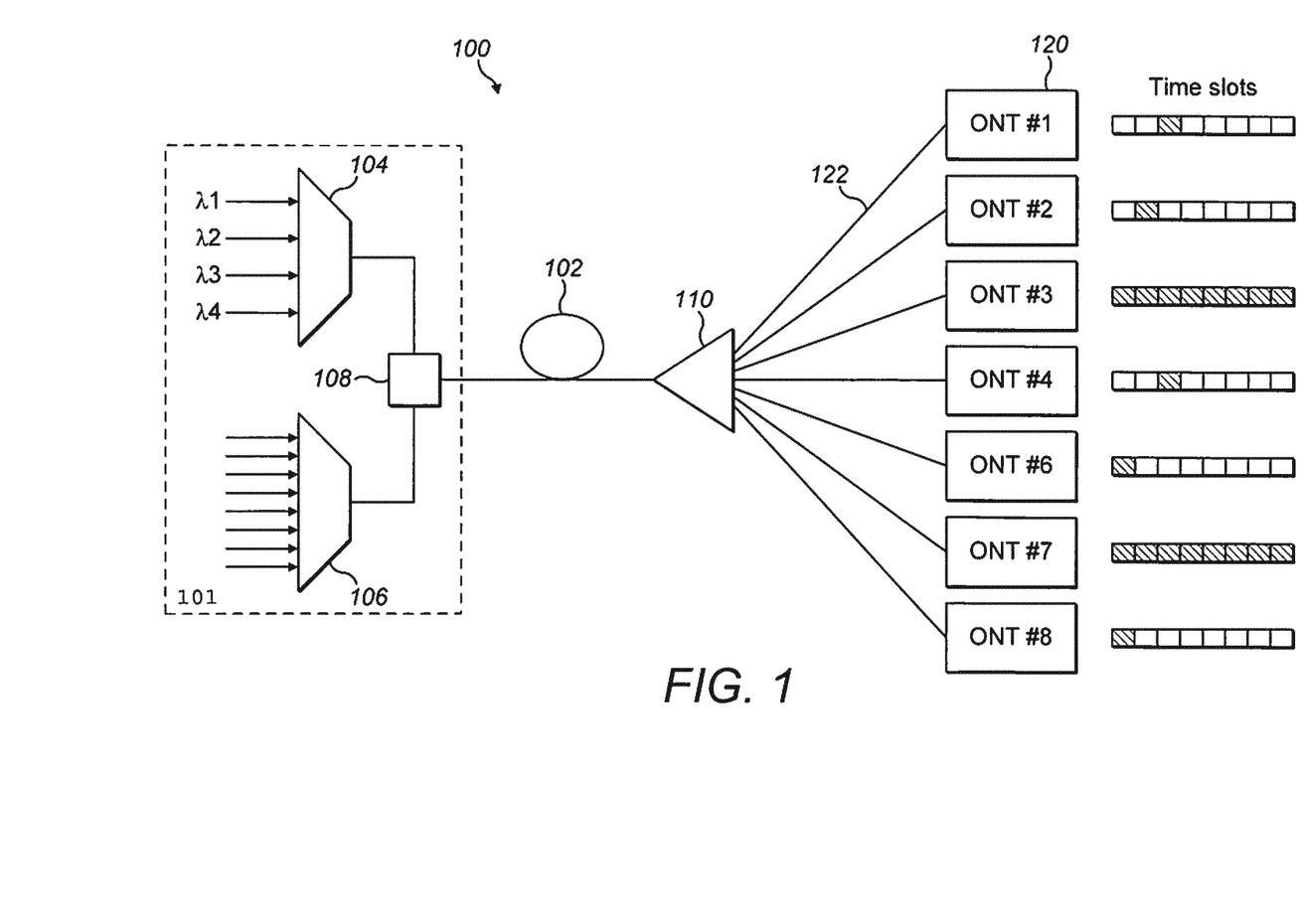
FIG. 1 is a block diagram illustrating an example PON network.

Second Next Generation Passive Optical Network NG-PON2 is an ITU-T standard for fixed access networks, described in the Recommendation Series ITU-T G.989.x. FIG. 1 illustrates the fundamental mechanism of a NG-PON2 system 100. NG-PON2 is compatible with existing PON fiber infrastructure, based on passive optical splitters 110 that broadcast data to Optical Network Termination (ONT) units 120 through dedicated fiber cables 122. NG-PON2 makes available to each subscriber 10 Gbit/s symmetric upstream/downstream capacity. It uses 4 (8 in future) wavelengths at 10 Gbit/s, giving a total network throughput of 40 Gbit/s (80 Gbit/s in future). Each wavelength can be time-division multiplexed among several ONTs 120, as in earlier PON generations.

NG-PON2 makes use of tunable filters and tunable lasers (not shown) at each ONT 120 to have a single ONT 120 variant working at all the wavelengths. An Optical Line Terminal (OLT) 101 includes optical transmitters (not shown) generating a plurality of optical wavelengths for carrying data to the ONTs 120. In this example, a plurality of generated wavelengths ($\lambda 1, \lambda 2, \lambda 3, \lambda 4$) carry time division multiplexed data and multiplexed by a WDM multiplexer/demultiplexer 104. The time division multiplexed data allocates data for different ONTs in different time slots. Optionally, a plurality of wavelengths are generated as point-to-point wavelengths, and multiplexed in a WDM multiplexer/demultiplexer 106. The point-to point wavelengths are dedicated to particular ONTs, i.e. not shared by multiple ONTs using time division multiplexing.

The time division multiplexed and point-to-point wavelengths are combined by a band filter 108 and transmitted over an optical fiber network 102 to an optical splitter 110, which broadcasts the wavelengths on separate fibers 122 to each ONT 120. Downstream, the wavelengths are filtered at each ONT 120 by an actively tunable optical filter that passes only the desired downstream wavelength to the receiver. In the upstream direction, tunable lasers at each ONT 120 are configured to the transmission wavelength. In addition to the 4 or 8 time division multiplexed wavelengths, other wavelengths can be dedicated to point-to-point connections.

In the example, shown ONT #1 and ONT #6 share $\lambda 1$ via time division multiplexing, i.e. time division multiple access. ONT #2, ONT #4 and ONT #8 share $\lambda 2$ via time division multiplexing, i.e. time division multiple access. ONT #3 and ONT #7 receive point-to-point wavelengths.

In a split radio architecture, the base station in a radio access network is separated into two remote parts or units: a Remote Radio Unit (RRU), which just includes basic physical layer functionalities, and a separate baseband processing unit (BBU). The link connecting the two units, usually over optical fiber, is called fronthaul. This way, the RRUs have smaller footprint, energy consumption and cooling requirements than a complete base station. Further resource and performance optimization is enabled by the centralization of radio signal processing in a single site serving several RRUs. This scenario is referred as Centralized RAN. The Cloud Infrastructure Radio Access Network (C-RAN) concept provide for virtualizing a shared BBU pool providing baseband processing (usually called a Baseband Hotel) in a computing cluster (the cloud).

The baseband hotel of a radio access network and the optical line terminal (OLT) of a fixed access network can be hosted in the same site, e.g. at an operators site or central office, CO, for example to save maintenance costs. In a virtualized implementation, the same computing cluster can process data of both mobile users (i.e. using the radio access network) and fixed users (i.e. using the fixed access, PON, network).

The fronthaul link connecting one RRU to a BBU can be a physical optical fiber (point to point fronthaul) or be performed exploiting one of the techniques used in current optical networks, such as packet switching, OTN, WDM, or one of the variants of PON.

A backhaul link (or network) provides a connection for non-split radio base stations (i.e. having a combined radio unit and baseband processing) to the core network. An Ethernet link may be used for backhaul.

Using a same optical network for a data connection for both fixed access users and radio access users (e.g fronthaul and/or backhaul) may provide advantages.

However, the fronthaul signal are time-sensitive, and a strict maximum latency may be required for fronthaul signals. Fronthaul traffic requires high bandwidth and deterministic delays. Effectively providing for the different types of communication on the same optical network is desired.

SUMMARY

According to a first aspect of the present disclosure, there is provided a method for scheduling resources for a Wavelength Division Multiplexed, WDM, Passive Optical Network, PON. The WDM PON comprises a central hub and a plurality of remote Optical Network Terminals, ONTs, handling different types of communications traffic. The method comprises receiving a notification message from the plurality of remote Optical Network Terminals, ONTs, indicating a loading status of the ONT, and allocating one or more slots to a plurality of the ONTs based on the received notification messages from the ONTs, wherein the plurality of ONTs handle different types of communications traffic. The slots is allocated based on the received notification messages as a time slot which is time division multiplexed with further time slots, and each slot is further allocated based on the received notification messages as an optical wavelength of a plurality of optical wavelengths of the WDM PON.

In some aspects, the different types of communications traffic are mobile radio traffic and fixed access traffic, and optionally, the mobile radio traffic comprises fronthaul radio traffic and/or backhaul radio traffic, and/or, the fixed access traffic comprises one or more of residential fixed access traffic and/or enterprise fixed access traffic.

In some aspects, the allocating comprises controlling a switch connected to equipment for mobile baseband processing and a fixed access OLT.

In some aspects, the notification message comprises an indication of a buffer occupancy of the ONT.

According to a second aspect of the present disclosure, there is provided an apparatus for scheduling resources for a Wavelength Division Multiplexed, WDM, Passive Optical Network, PON. The WDM PON comprises a central hub and a plurality of remote Optical Network Terminals, ONTs, handling different types of communications traffic. The apparatus comprising a processor and a memory, the memory containing instructions executable by the processor such that the apparatus is operable to receive a notification message from the plurality of remote Optical Network Terminals, ONTs, indicating a loading status of the ONT, and allocate one or more slots to a plurality of the ONTs based on the received notification messages from the ONTs, wherein the plurality of ONTs handle different types of communications traffic. The slots are allocated based on the received notification messages as a time slot which is time division multiplexed with further time slots, and the slots are further allocated based on the received notification messages as an optical wavelength of a plurality of optical wavelengths of the WDM PON.

According to a third aspect of the present disclosure, there is provided a method for an Optical Network Terminal, ONT, in a Wavelength Division Multiplexed, WDM, Passive Optical Network, PON. The WDM PON comprises a central hub and a plurality of remote ONTs handling different types of communications traffic. The method comprises transmitting a notification message from the ONT to the central hub indicating a loading status of the ONT, and receiving an allocation from the central hub of one or more slots based on the received notification messages from the ONTs. The slots are allocated based on the received notification messages as a time slot which is time division multiplexed with further time slots. The slots are further allocated based on the received notification messages as an optical wavelength of a plurality of optical wavelengths of the WDM PON.

According to a fourth aspect of the present disclosure, there is provided an Optical Network Terminal, ONT, in a Wavelength Division Multiplexed, WDM, Passive Optical Network, PON. The WDM PON comprises a central hub and a plurality of remote Optical Network Terminals, ONTs, handling different types of communications traffic, the apparatus comprising a processor and a memory, the memory containing instructions executable by the processor such that the apparatus is operable to transmit a notification message from the ONT to the central hub indicating a loading status of the ONT and receive an allocation from the central hub of one or more slots based on the received notification messages from the ONTs. The slots are allocated based on the received notification messages as a time slot which is time division multiplexed with further time slots, and slots are further allocated based on the received notification messages as an optical wavelength of a plurality of optical wavelengths of the WDM PON.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

In some aspects, this disclosure refers to a fronthaul and/or backhaul network, which coexists with a fixed access network, over a WDM PON (e.g. NG-PON2) infrastructure. This has advantages of using the fiber infrastructure installed for fixed access for multiple purposes, enabling the optimal usage of resources in both time and wavelength domains.

The disclosure provides a WDM optical network to select and assign bandwidth resources, i.e. a wavelength channel and time slots on that channel, to fixed and mobile "users" connected to the network. In some aspects, a slot may be defined as both a determined wavelength and time slot. The wavelength and time slots are allocated together, based on the requirements of a plurality, or all, of the connected ONTs.

Examples of applications are fronthaul and backhaul links, possibly already multiplexed in high capacity pipes, and dedicated connections to enterprise premises. In principle, supporting different kind of services allows an exploitation of the aggregate capacity of WDM PON, e.g. NG-PON2. The present examples provide for flexibility and dynamic reconfiguration to concurrently allocate time and wavelength resources to transport multiple data traffic types which have very different requirements in terms of bandwidth, latency and traffic distribution over time. The combination of time and wavelength division multiplexing is referred as TWDM.

Figure 2:
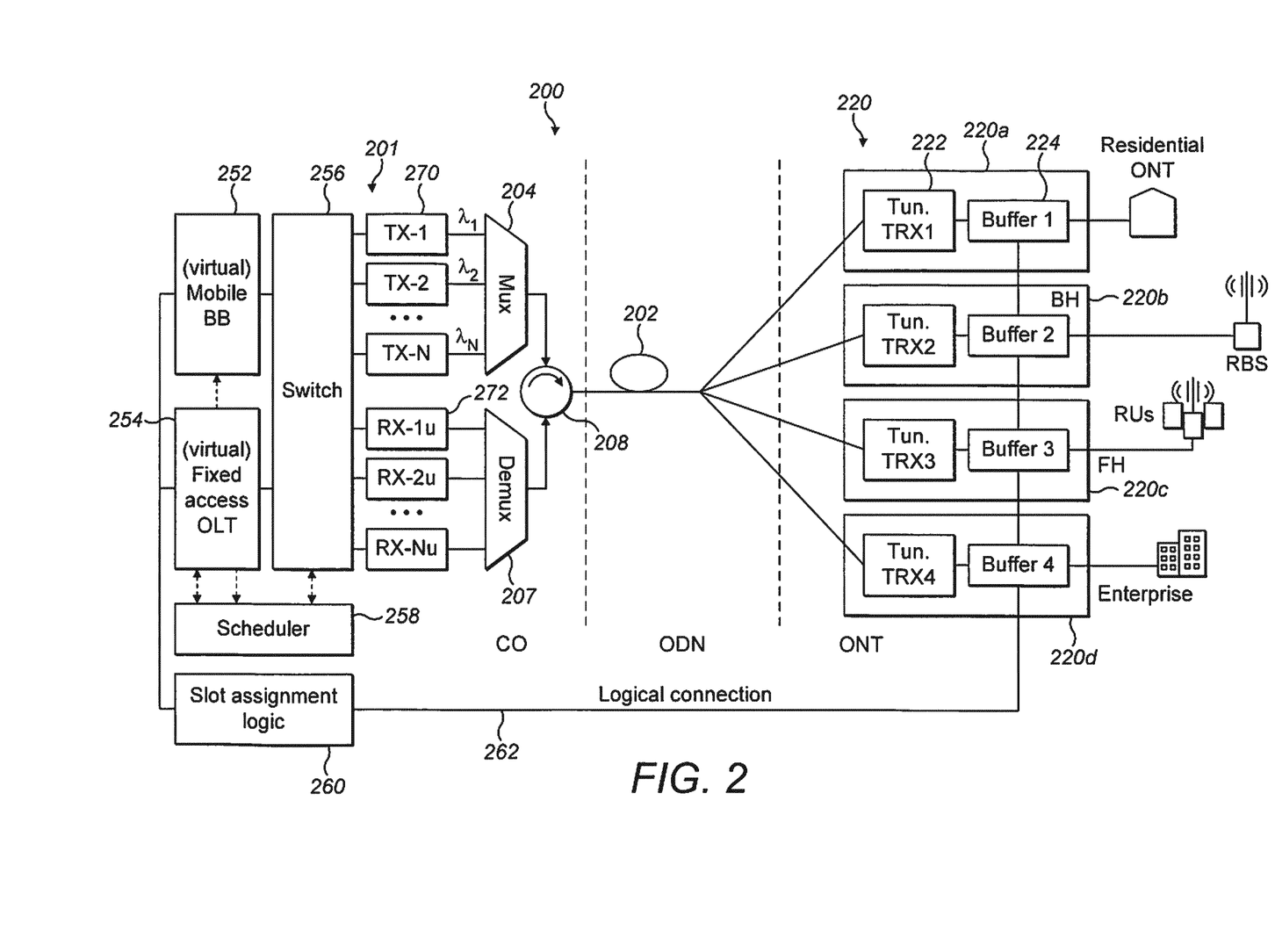
FIG. 2 is a block diagram illustrating an example PON network serving a radio access network and fixed access users.

FIG. 2 is an example of a WDM PON system 200 according to an example of the disclosure. The WDM PON system 200 comprises a central hub 201, which may also be referred to as a Central Office. In some aspects, elements of the central hub 201 may be co-located or distributed, and elements described as part of the central hub 201 may alternatively be considered as connected to the central hub.

The central hub 201 comprises equipment for mobile baseband processing (BBUs) 252 and a fixed access OLT 254, connected to a TDM or packet switch 256. The switch 256 is arranged to switch data from the BBUs 252 and OLT 254 onto time slots or packets. The central hub further comprises a scheduler 258 based on a Slot Assignment Logic (SAL) 260, as described in more detail below. The scheduler and Slot Assignment Logic (SAL) are connected to the BBUs 252, OLT 225 and switch 256.

The central hub 201 further comprises optical transmitters 270, e.g. lasers, configured to generate a plurality of modulated optical wavelengths from electrical signals, and a multiplexer 204 for multiplexing the wavelengths onto an optical network 202, e.g onto an optical fiber. The central hub 201 further comprises optical receivers 272, e.g. photodiodes, configured to receive a plurality of optical wavelengths from the optical network 202, as split up by an optical demultiplexer 207. The receivers 272 are configured to output electrical signals, corresponding to the received optical signals, to the switch 256. The optical network 202 is arranged to split the WDM optical signals from the central hub, and distribute the wavelengths to all of the ONTs. For example, the distribution to the ONTs may use a passive optical device, e.g. the splitter 110 described in FIG. 1. The optical network 202 also functions to combine the optical signals from the ONTs 220 for transmission to the central hub 201.

The switch 256 comprises input ports connected to the BBUs and the OLT and output ports for connection to the transmitters 270/receivers 272. The switching between the input ports and output ports is controlled by the scheduler 258. The scheduler 258 is configured to dynamically map input ports connected to the BBUs and the OLT into output wavelength ports.

A remapping time, which is a time required for the switch 256 to change the connections between its input ports and output ports, must be higher than the sum of scheduler computation time, switch configuration time, propagation time from OLT to ONT, and ONT DWDM equipment configuration time.

The system 200 comprises a plurality of ONTs 220. In some aspects, the ONTs include one or more of a WDM multiplexer and demultiplexer to handle a plurality of WDM wavelengths, tunable WDM transceivers 222 (i.e. for transmission and receiving of optical signals). The ONTs further comprise a buffer 224 which can be used to buffer traffic for a transmission type, e.g. radio base stations for backhaul services, radio units for fronthaul services, residential users or point-to-point services to enterprises. The WDM PON system 200 may comprise any combination of these transmission types, and not all transmission types may be present in the system 200. One or more ONTs, e.g. a plurality of ONTs, may included for each of a plurality of the transmission types.

In some aspects, the plurality of ONTs handle different types of communications traffic. For example ONT 220*a* handles residential traffic, ONT 220*b* handles backhaul traffic for a radio base station, ONT 220*c* handles fronthaul traffic for a remote radio unit and ONT 220*d* handles enterprise traffic.

Each ONT 220, referred to as ONTs 220*a*,220*b*,220*c*, 220*d*, contains a buffer 224. When the buffer 224 becomes congested, e.g. the buffer filling exceeds a threshold, the ONT 220 sends a transmission request message to the OLT, e.g. on a logical connection 262. In some aspects, in order to notify the central hub in good time before full congestion occurs, a plurality, e.g. three, levels of buffer occupancy are set and communicated, for example indicating low load, medium load, and full load. The messages indicating the buffer loading do not occur at random times, but are synchronous to the TTI of the mobile network. For example, for a LTE mobile network having a 1 ms TTI, the messages indicating buffer loading are transmitted every TTI or a multiple of the TTI. Further references to TTI refer to a radio access TTI, or a multiple of a radio access TTI.

In some aspects, the logical connection 262 uses the optical network 202 for transmission of the transmission request messages indicated buffer occupancy. The connection 262 is shown separately merely for clarity.

The interval between two transmission request messages indicating buffer occupancy should be selected to be short enough to provide the QoS required by the connected fixed access or the mobile networks (e.g. in terms of latency). The selected interval should also be sufficiently long to allow the reconfiguration of optical tunable lasers and filters at the ONT, since in some aspects a wavelength is reassigned based on the transmission request messages.

In a configuration phase of the system, the levels of buffer occupancy (e.g in terms of thresholds) are calculated at the OLT, based on TTI and QoS, and communicated to the ONTs. The configuration of the ONTs can be manual, at the installation, or automated, e.g. performed by a SDN controller, during the network operation. In a later operative phase, the messages indicating congestion levels are sent to the OLT, based on that configuration.

To assign traffic to the users (i.e. ONTs), the central hub 201 allocates time slots and wavelengths, e.g. according to a time-wavelength matrix. For example, rows and columns of the matrix correspond to wavelengths and time (e.g. TTI) intervals, respectively. In some aspects, a time slot may be considered as a sequence of consecutive radio TTI intervals at a given wavelength, assigned to a user (i.e. an ONT 201). At each TTI or multiple of a TTI, the slot assignment logic (SAL) 260 checks the congestion levels of the ONT buffers and assigns slots giving the highest priority to the most loaded ONTs. The slots may be considered as time slots in a TDMA allocation, and at a particular wavelength in a WDM system. The slots allocated by the SAL may be one or more time slots on one or more wavelengths.

The analysis by the SAL is based on the indicated loading of all ONTs (e.g. based on their buffer occupancy). This allows the SAL to have an awareness of the traffic requests almost in real time. Then, the SAL assigns transmission slots to the users (ONTs) that require them urgently, according to the feedback provided by the ONTs. The mechanism functions as a scheduler that is based on actions at two remote sites, i.e. the switch 256 in the central office and the ONTs (i.e. comprising the buffers 224).

The ONTs 220 provide a type of notification message, e.g. providing a loading or congestion indication, which is independent of the traffic type provided to the ONTs 220. For example, a radio access ONT handling fronthaul or backhaul data provides a loading indication which is compatible with (e.g. in the same format) as the loading indication on a fixed access ONT handling residential and/or enterprise fixed access. Thus, the loading indications from all the ONTs are of a common type.

The SAL 260 provides a time and wavelength slot assignment based on all the ONTs, i.e. ONTs handling different types of communication. This is possible because: a) a common prioritization mechanism, e.g. based on thresholds, is defined for fixed and mobile users or, in general, for users having different QoS requirements (e.g. different tolerated latencies); 2) the transmission is synchronized to the TTI of the radio network. Thus, the SAL 260 and scheduler provide for joint scheduling of all the ONTs, i.e. ONTs handling different types of communication traffic. As such, the mobile radio traffic is not scheduled separately to the fixed access traffic. Instead, both the mobile radio traffic and fixed access traffic are jointly scheduled, i.e. compete for the same time and wavelength resources based on their loading status, QoS parameters and any other parameters.

The SAL 260 is configured to communicate the slot assignments required for all the ONTs to the scheduler 258, the scheduler controlling the switch 256 accordingly. In particular, the SAL 260 assigns slots according to the traffic requirements, e.g. to avoid a buffer being over-filled or to meet latency or QoS requirements of particular ONTs. In some aspects, the SAL calculates the dynamic sharing level, which is not performed by standard schedulers in packet switches. The SAL then assigns the slots to the users (i.e. ONTs), taking into account of the dynamic sharing level. As such, the SAL provides the slot assignment logics to the scheduler.

The slot allocation can be applied to the whole time-wavelength matrix or to a subset of its slots. For example, a part of the total number of slots could be pre-assigned, typically to guarantee a minimum bandwidth to the users, while the remaining ones could be dynamically shared according to the examples described.

Fixed access networks that use the time-wavelength division multiplexing approach allow to connect a high number of broadband users. This allows an exploitation of their full potentiality when clients with different QoS requirements (e.g. fixed and mobile terminals) are connected. Examples of the disclosure define a simple to implement, unified mechanism to prioritize traffic requests coming from heterogeneous clients. Aspects allow a slot determination based on a constraint imposed by the technology (e.g. tunable devices setting times). For example, a constraint is that it is not possible to reassign wavelengths faster than the time that is needed for a component to implement the change in wavelength, e.g. for an optical transmitter to retune its wavelength. Even if the TTI is very short, a change to reassign a wavelength requires a longer time, e.g. a large multiple of the TTI.

Fronthaul traffic requires high bandwidth and deterministic delays that could be accommodated by assigning a fixed sequence of time slots within the PON frame. However, this would absorb bandwidth to the fixed access users, possibly violating their SLA. On the other hand, reserving a wavelength to each fronthaul or backhaul connection would rapidly saturate the number of available links. Moreover, seldom those links would work at full capacity, especially in the backhaul case. In some aspects, the described method and apparatus provides for using the spare bandwidth for "best effort" or non-time sensitive traffic, would avoid waste of resources.

Figure 3A:
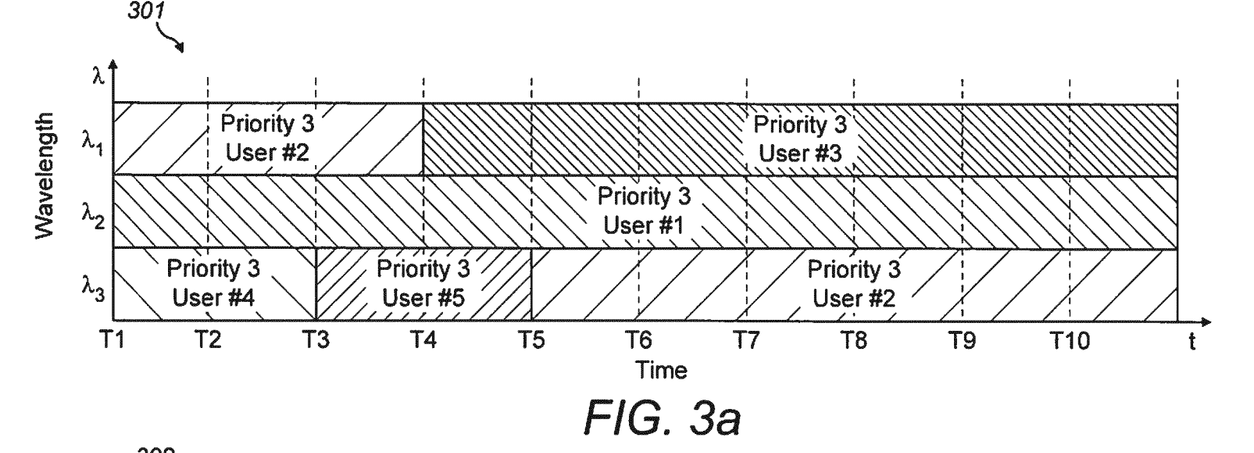
FIGS. 3a and 3b are example time and wavelength division multiplexing allocations.
Figure 3B:
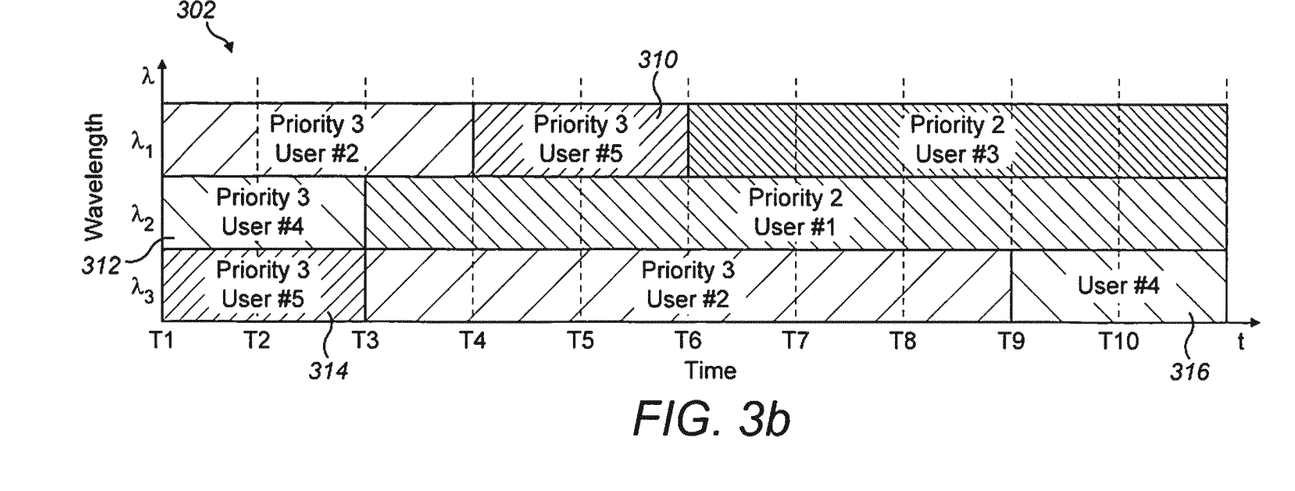

FIGS. 3a and 3b show examples of a time-wavelength matrix 301, 302. The input ports of the OLT switch, i.e. the electrical ports of the packet switch 256, may be generically referred as users. The ONTs are both mobile and fixed services, e.g. that have different priority and/or latency demands. The time units shown may be units of radio TTI a multiple of radio TTI.

In FIG. 3a, as example, is reported the case of the assignment of the wavelength-time slot in the matrix as an initial allocation to each user, for example, a priority 3 is assigned based on the congestion level, indicating the ONT buffers are quasi-empty or have a low congestion under a first threshold.

FIG. 3b a later allocation is shown, as allocated by the SAL 260. Some slots previously allocated to User 3 and User 2 are re-assigned to User 5 and User 4. For example, on λ1 time slots 310 between T4 and T6 are allocated to User #5, and on λ2 time slots 312 between T1 and T3 are allocated to User #4. On λ3 time slots 314 between T1 and T3 are allocated to User #5 and time slots 316 between T9 and T10 are allocated to User #4. As such, time slots across a plurality of wavelengths are jointly assigned according to the requirements of the different types of users (ONTs). Other time slots retain the previous allocation.

In some examples, the allocating comprises allocating all time slots on an optical wavelength to an ONT. This may still be considered as an allocation of time slots, i.e. the allocation is determined to be all time slots on a particular wavelength. In this case, there is no time division multiplexing with other ONTs. This provides for a dedicated wavelength providing a point-to-point connection, e.g. as shown for ONT 220d. This dedicated wavelength is additional to wavelengths which have time slots which are time division multiplexed between ONTs.

Figure 4A:
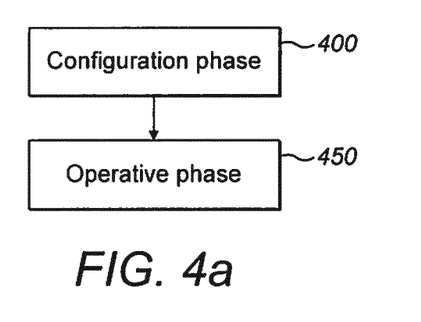
FIGS. 4a and 4b are flow chart illustrating process steps in a method.
Figure 4B:
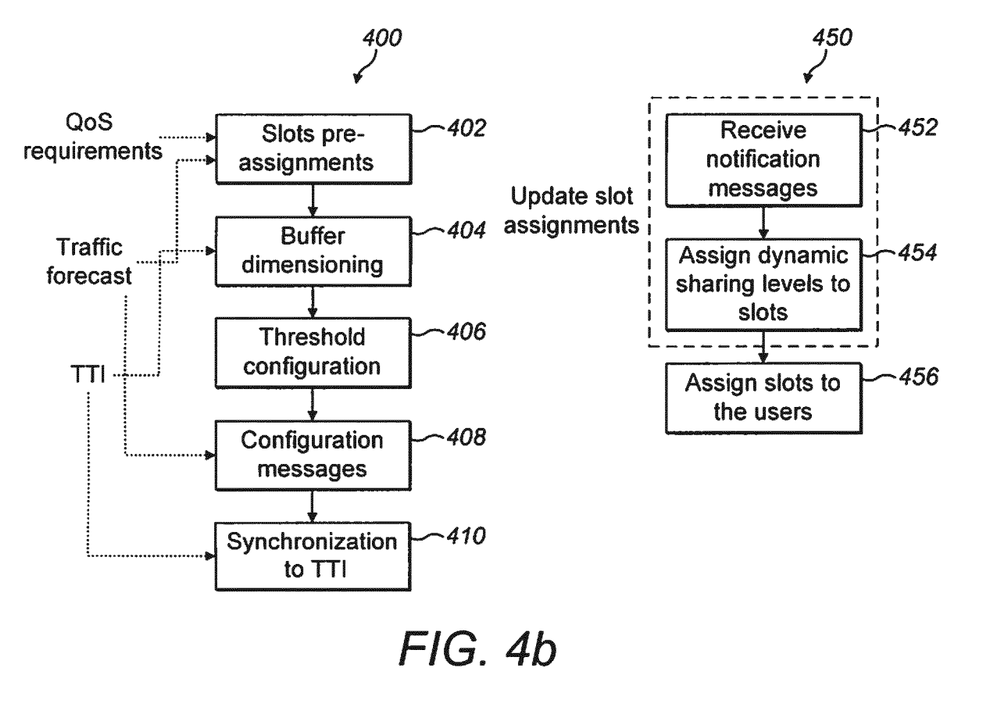

FIGS. 4a and 4b illustrates that, in some aspects, the scheduling may be carried out in one or both of a configuration phase 400 and an operative phase 450. The configuration phase may be carried out at the set up of the system, e.g. following a change in the connected ONTs or at the central office.

Configuration Phase

1. In 402, pre-assignment of the slots, according to QoS requirements and forecast of traffic requests. During this step, it is decided what slots are assigned to specific users, and what can be shared among more users to deal with statistically multiplexed traffic. The pre-assignment can be modified, for example by network management system, depending on the policy that the operator decides to apply.
2. In 404, Dimensioning of the buffers, according to QoS requirements and (suitable multiple of) TTI. In some aspects, dimensioning the buffer comprises determining a maximum number of transmission requests that can be queued, according to the QoS policy. An example QoS requirement may be latency, which is affected by processing time and transmission delay between OLT and ONT.
3. In 406, configuration of the congestion thresholds, according to buffer size (Step 2) and traffic forecast (Step 1).
4. In 408, configuration of the notification message from ONT to OLT for sending transmission requests, using the thresholds set in step 3
5. In 410, synchronization of the transmission to the TTI, e.g. every radio TTI or a multiple of the TTI.

Operative Phase

Figure 5:
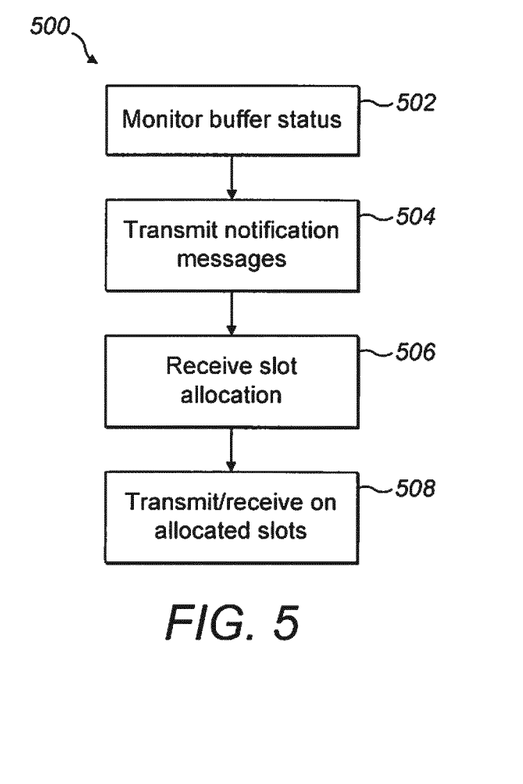
FIG. 5 is a flow chart illustrating process steps in another example of a method.

The operative phase 450 provides for an iterative, or dynamic, re-allocation of slots throughout the network operation period. The following steps may be carried out, all synchronous to the TTI:

1. Update of the slot assignment based on the received notification messages from the ONTs. At this step, the SAL 260:
   a. In 452, receives the notification messages
   b. In 454, based on the notification messages, assigns to each slot (i.e. sequence of consecutive TTI intervals for each wavelength) a "dynamic sharing level" based on the buffer threshold indicated in the notification message. For example, the SAL 260 may assign each ONT to one of a plurality of priority levels, e.g. three levels:
      Level 3=the current user did not issue a transmission request;
      Level 2=the current user has data to transit but the slot can be temporarily assigned to another user;
      Level 1=the current user must continue transmit, otherwise the traffic is lost.
      The assignment of the slots by the SAL 260 is an assignment of both time resources and wavelength resources. The allocation of the time and wavelength resources is carried out together, i.e. the overall time and wavelength resources are considered in a single step to prioritize traffic according to the determined congestion levels.
2. In 456, assignment of the slots to the users, taking into account of the dynamic sharing level. The assignment of the slots is carried out by the scheduler 258, based on indications received from the SAL 260. The assignment of the slot is an assignment of both time resources and wavelength resources in combination. If no slots can be assigned, a corresponding message is sent back to the SAL 260 reporting the lack of resources FIG. 5 shows a method 500 which may be carried out by the ONTs, in order to support the actions carried out in the central hub 201.

In 502, each ONT monitors its buffer status or other internal indicator of loading or congestion. In some aspects, the buffer status or congestion refers to upstream traffic from the ONTs to the central hub 201.

In 504, each ONT generates and transmits a notification message to the central hub 201. The notification message includes an indication of the loading, as determined in 502. In some aspects, the notification message includes a value indicating a comparison of the loading with one or more thresholds, or some other value indicating the ONT loading.

In 506, each ONT receives a message indicating an allocation of slots. The indication may only be changed allocations, or may be for all allocated slots. The allocation is calculated at the central hub according to any example, taking into account the demands of the whole WDM PON network.

In 508, the ONT is then configured to transmit or receive on the allocated slots. For example, the tunable transceiver may require re-tuning to transmit on a changed wavelength allocation.

Figure 6:
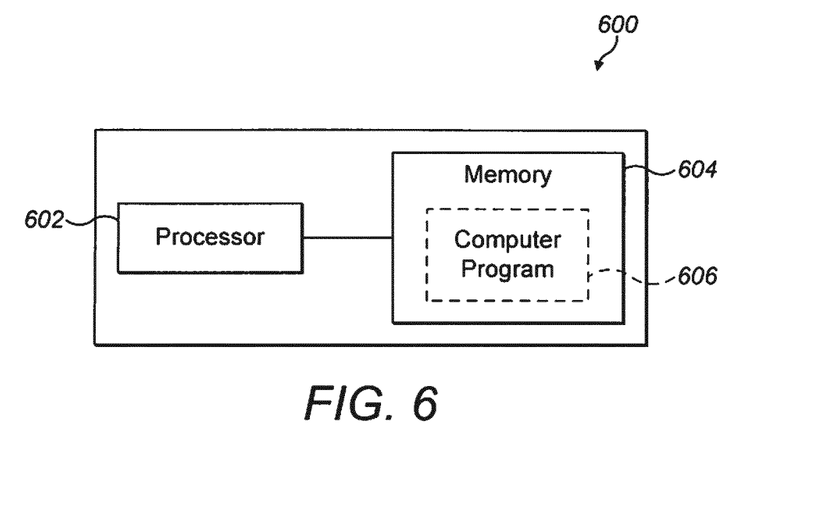
FIG. 6 is an example of an apparatus configured to perform examples of the disclosure.

FIG. 6 is a block diagram illustrating a controller having functional units 600 as part of the central hub 201 or ONT 220 according to any example. For example, the controller 600 may be used as any one of the SAL 260, scheduler 258, baseband processing 252, OLT 254, or ONT 220, for carrying out any action or method described. For example, the controller 600 in an ONT 220 may monitor the buffer, generate and initiate transmission of the notification message and re-configure the ONT based on a received slot allocation. In a further example, the controller in the SAL 260 and/or scheduler 258 may receive the notification messages, determine a slot allocation, control the switch 256 and notify the ONTs of the slot allocation.

Referring to FIG. 6, the controller 600 comprises a processor 602 (alternatively referred to as processing circuitry), a memory 604 and may also comprise interfaces (not shown). The memory 604 contains instructions executable by the processor 602 such that the controller 600 is operative to conduct some or all of the steps of any method described. The instructions may be stored in the form of a computer program 606. For example, the processor 402 may be implemented by any type of integrated circuit, e.g. ASIC or FPGA etc. The memory may be any suitable memory for the processor, e.g. RAM, ROM, solid state disk, hard disk drive etc.

Aspects of the disclosure provide a mechanism to assign bandwidth resources in a network with a centralized scheduling node, i.e. the central hub. Each user (i.e. ONT) sends a notification message to the central hub (including the OLT) when its transmission buffer tends to be congested. In some aspects, the messages correspond to three levels of buffer occupancy: low load, medium load, and full load. The transmission of the buffer indication does not occur randomly but is synchronous to the TTI of a mobile network connected to the scheduling node. The priority of each ONT 220 is allocated, e.g. based on the levels of buffer occupancy and based on TTI and/or QoS, and communicated to the switch 256 to implement the allocation.

A slot assignment logic (SAL) at the central hub (i.e. scheduling node) checks the level of congestion (i.e. occupancy) of the users and accordingly assigns to each user TTI intervals (e.g. consecutive TTI intervals) at a certain wavelength (slots). The highest priority is given to the most loaded ONTs.

Aspects of the disclosure may relate to apparatus and methods in the central hub, SAL, scheduler and/or one or more ONTs. Any example described for any aspect of the disclosure may be used in any combination for another example or node.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

| Abbreviation | Explanation |
| --- | --- |
| BBU | Baseband Unit |
| CO | Central Office |
| C-RAN | Centralized Radio Access Network |
| DWDM | Dense Wavelength Division Multiplexing |
| FSAN | Full-Services Access Network |
| ITU-T | International Telecommunication Union-Telecommunications |
| NG-PON2 | Second Next Generation Passive Optical Network |
| OLT | Optical Line Terminal |
| ONT | Optical Network Termination |
| OTN | Optical Transport Network |
| PON | Passive Optical Network |
| QoS | Quality of Service |
| RAN | Radio Access Network |
| RRU | Remote Radio Unit |
| SAL | Slot Assignment Logic |
| SDN | Software Defined Network |
| SLA | Service Level Agreement |
| TTI | Transmission Time Interval |
| TWDM | Time Wavelength Division Multiplexing |
| WDM | Wavelength Division Multiplexing |

The invention claimed is:

1. A method for scheduling resources for a Wavelength Division Multiplexed, WDM, Passive Optical Network, PON, wherein the WDM PON comprises a central hub and a plurality of remote Optical Network Terminals, ONTs, handling different types of communications traffic, wherein the method comprises:
   receiving a notification message from the plurality of remote Optical Network Terminals, ONTs, indicating a loading status of the ONT,
   allocating one or more slots to a plurality of the ONTs based on the received notification messages from the ONTs, wherein the plurality of ONTs handle different types of communications traffic and,
   wherein the slots are allocated based on the received notification messages as a time slot which is time division multiplexed with further time slots, and the slots are further allocated based on the received notification messages on an optical wavelength of a plurality of optical wavelengths of the WDM PON.

2. The method as claimed in claim 1, wherein the different types of communications traffic are mobile radio traffic and fixed access traffic.

3. The method as claimed in claim 2, wherein the mobile radio traffic comprises fronthaul radio traffic and/or backhaul radio traffic.

4. The method as claimed in claim 2, wherein the fixed access traffic comprises one or more of residential fixed access traffic and/or enterprise fixed access traffic.

5. The method as claimed in claim 1, wherein the allocation is further based on a QoS requirement of the ONT, and optionally, the QoS requirement is latency.

6. The method as claimed in claim 1, wherein the allocating comprises allocating an optical wavelength, without time division multiplexing with other ONTs.

7. The method as claimed in claim 1, wherein the allocating comprises controlling a switch connected to equipment for mobile baseband processing and a fixed access OLT.

8. The method as claimed in claim 1, comprising receiving the notification message indicating a loading status of the ONT synchronous to the radio access TTI, and optionally at each radio access TTI, or a multiple of the radio access TTI.

9. The method as claimed in claim 1, wherein the notification message comprises an indication of a buffer occupancy of the ONT.

10. Apparatus for scheduling resources for a Wavelength Division Multiplexed, WDM, Passive Optical Network, PON, wherein the WDM PON comprises a central hub and a plurality of remote Optical Network Terminals, ONTs, handling different types of communications traffic, the apparatus comprising a processor and a memory, the memory containing instructions executable by the processor such that the apparatus is operable to:
   receive a notification message from the plurality of remote Optical Network Terminals, ONTs, indicating a loading status of the ONT,
   allocate one or more slots to a plurality of the ONTs based on the received notification messages from the ONTs, wherein the plurality of ONTs handle different types of communications traffic and,
   wherein the slots are allocated based on the received notification messages as a time slot which is time division multiplexed with further time slots, and the slots are further allocated based on the received notification messages as an optical wavelength of a plurality of optical wavelengths of the WDM PON.

11. The apparatus as claimed in claim 10, wherein the different types of communications traffic are mobile radio traffic and fixed access traffic, and optionally, the mobile radio traffic comprises fronthaul radio traffic and/or backhaul radio traffic, and/or, the fixed access traffic comprises one or more of residential fixed access traffic and/or enterprise fixed access traffic.

12. The apparatus as claimed in claim 11, wherein the notification message comprises an indication of a buffer occupancy of the ONT.

13. The apparatus as claimed in claim 10, wherein the allocating comprises controlling a switch connected to equipment for mobile baseband processing and a fixed access OLT.

14. A method for an Optical Network Terminal, ONT, in a Wavelength Division Multiplexed, WDM, Passive Optical Network, PON, wherein the WDM PON comprises a central hub and a plurality of remote ONTs handling different types of communications traffic, wherein the method comprises:
   transmitting a notification message from the ONT to the central hub indicating a loading status of the ONT,
   receiving an allocation from the central hub of one or more slots based on the received notification messages from the ONTs, and,
   wherein the slots are allocated based on the received notification messages as a time slot which is time division multiplexed with further time slots, and the slots are further allocated based on the received notification messages as an optical wavelength of a plurality of optical wavelengths of the WDM PON.

15. An Optical Network Terminal, ONT, in a Wavelength Division Multiplexed, WDM, Passive Optical Network, PON, wherein the WDM PON comprises a central hub and a plurality of remote Optical Network Terminals, ONTs, handling different types of communications traffic, the ONT comprising a processor and a memory, the memory containing instructions executable by the processor such that the ONT is operable to:
   transmit a notification message from the ONT to the central hub indicating a loading status of the ONT,
   receive an allocation from the central hub of one or more slots based on the received notification messages from the ONTs, and, wherein each slot is allocated based on the received notification messages as a time slot which is time division multiplexed with further time slots, and each slot is further allocated based on the received notification messages as an optical wavelength of a plurality of optical wavelengths of the WDM PON.

* * * * *